United States Patent Office 2,722,849
Patented Nov. 8, 1955

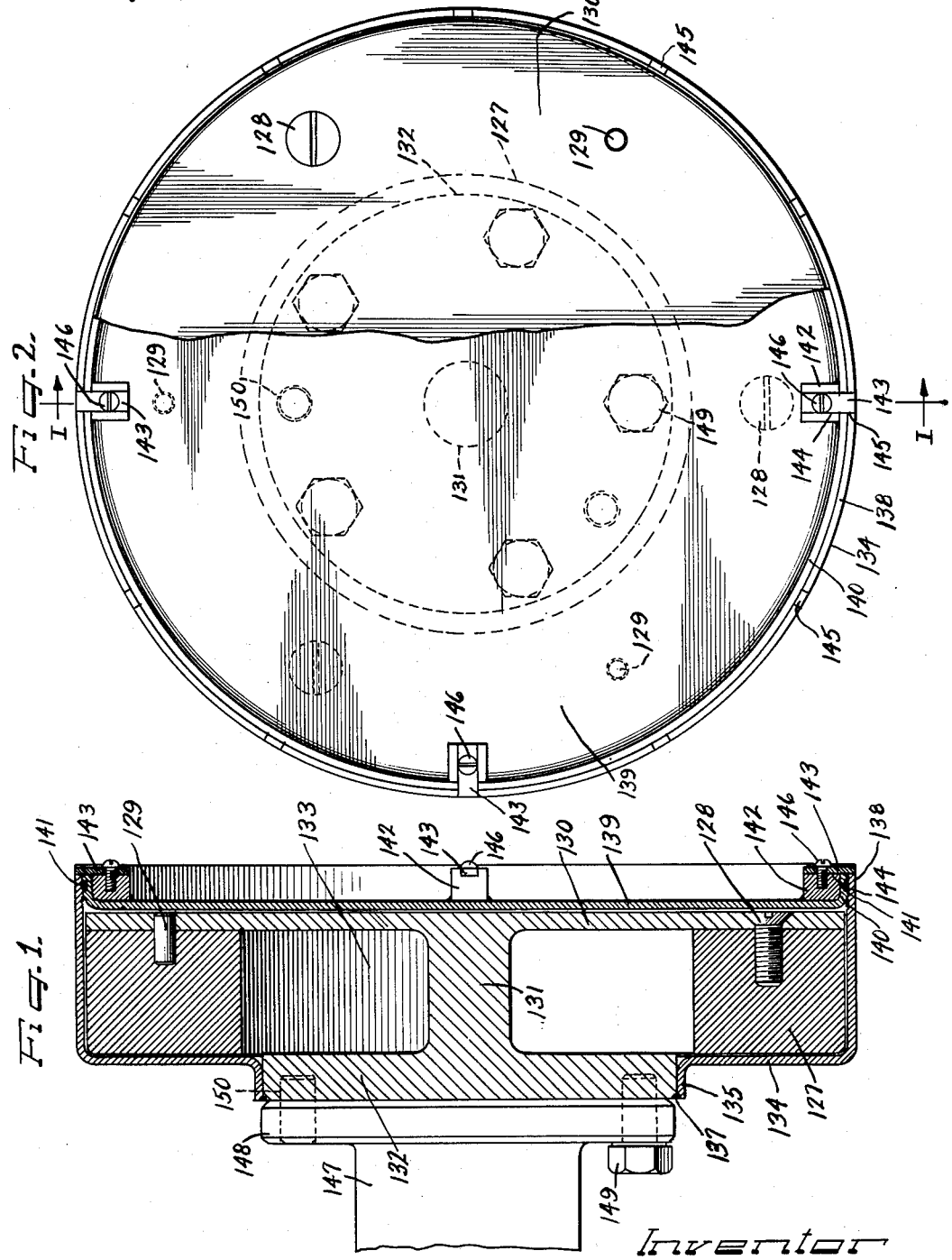

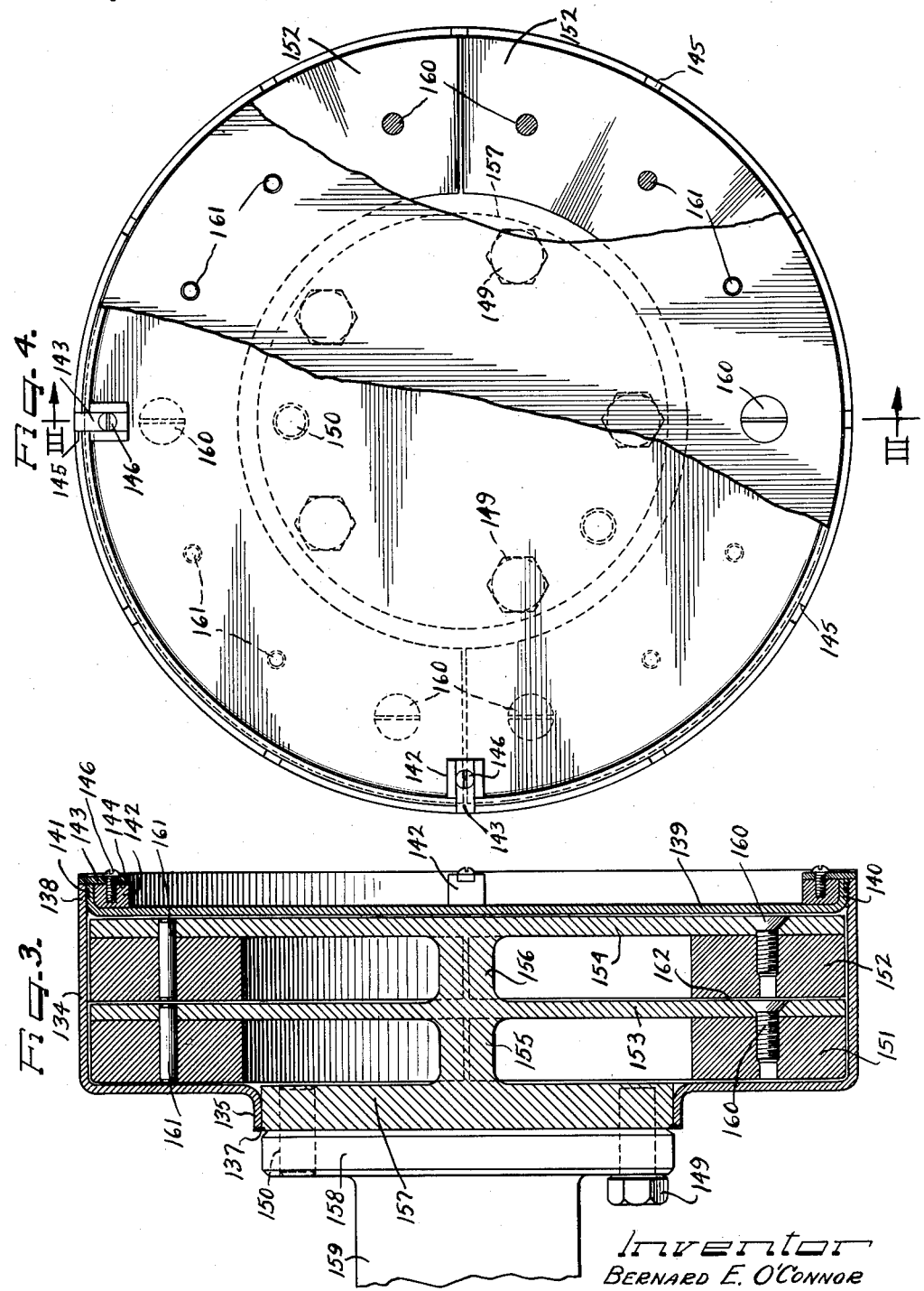

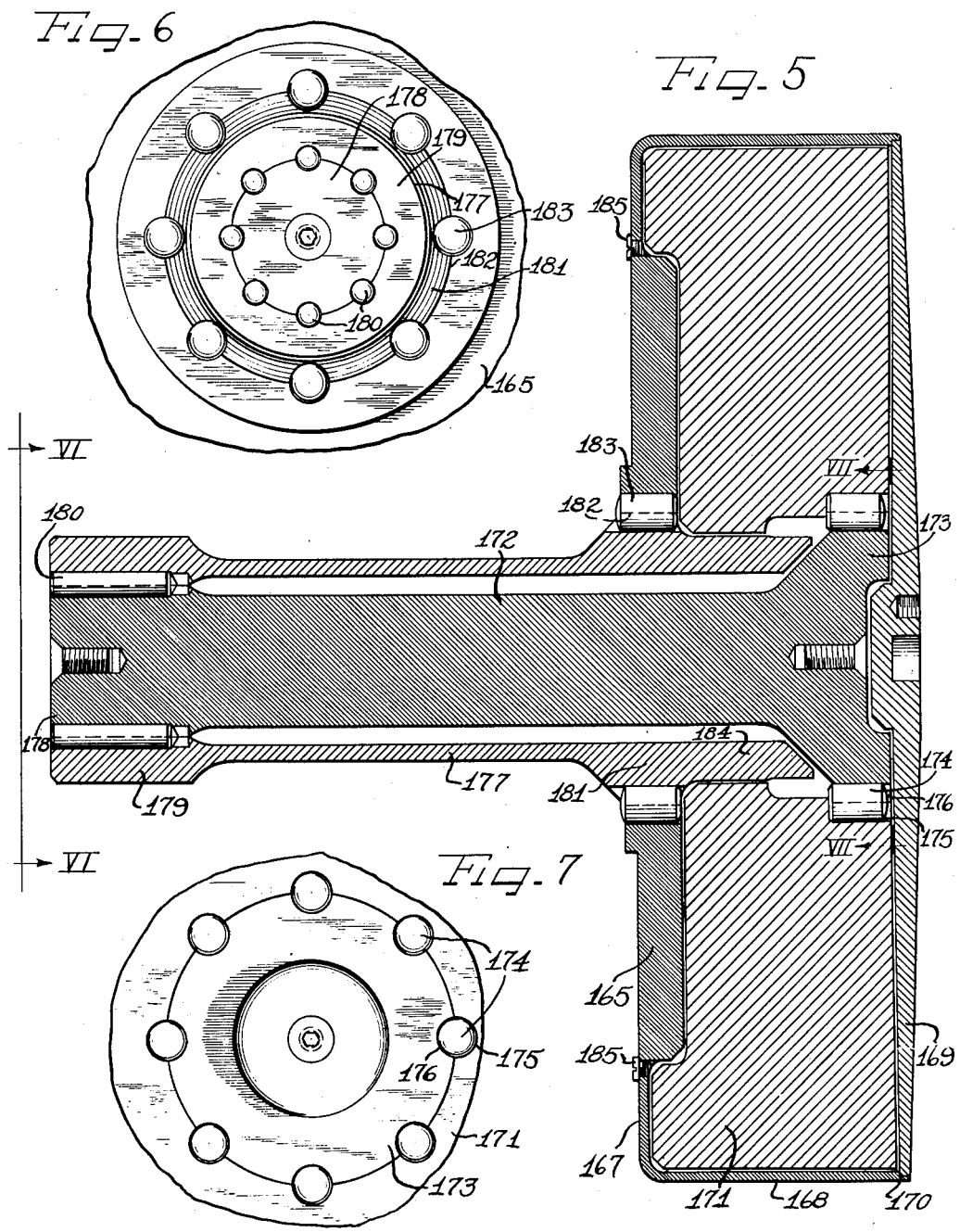

2,722,849
TUNED INERTIA MASS VISCOUS CRANKSHAFT DAMPERS

Bernard E. O'Connor, Buffalo, N. Y., assignor to Houdaille-Hershey Corporation, Detroit, Mich., a corporation of Michigan Application May 26, 1950, Serial No. 164,561

16 Claims. (Cl. 74—574)

This invention relates to improvements in vibration dampers and is more especially directed to overcoming the problem of torsional oscillations or vibrations in rotary masses such as the crankshafts of rotating machinery, of which internal combustion engines are a prime example, whereby to reduce or eliminate wear and noise and avoid fatigue failure which are resultants of such vibrations.

The present application is a continuation-in-part of my application Serial No. 618,099, filed September 24, 1945, now Patent No. 2,514,136, dated July 4, 1950.

As is well known, of course, torsional oscillations or vibrations arise in rotary crankshafts from the application of driving energy thereto periodically as, for example, in piston operated machines such as certain steam engines and in internal combustion engines where gases expanding with explosive force are relied upon to drive pistons connected to the crankshafts. As the energy is released to such a crankshaft, there is a more or less severe torsional or twisting impact at the point of application of the energy tending to cause the immediately affected portion of the crankshaft to overrun the remainder of the shaft. This reacts in a torsional vibration throughout the shaft. At high frequency, such torsional vibration may, and often does, attain a disagreeable, damaging and very often dangerous amplitude. The greatest danger, as will be appreciated, resides in the ultimate fatigue failure of the vibrated member due to the torsional vibrations, although the damaging effects of the vibrations on associated mechanism may in most instances be the main reason for desiring to eliminate them.

Heretofore, it has been proposed to dampen torsional vibration by means of frictional devices. However, such frictional devices have certain inherent shortcomings among which may be mentioned rapidly declining efficiency due to wear, excessive heating, undue sensitivity to atmospheric changes, undesirable reaction to temperature changes, and the like.

An important object of the present invention is to avoid the use of frictional means for damping torsional oscillations or vibrations but instead to utilize the shear resistance of viscous fluids in overcoming the problem.

Another object is to obtain higher efficiency in crankshaft dampers.

Still another object of the invention is to provide a crankshaft damper which is free from efficiency losses due to wearing of parts and therefore at all times maintains peak efficiency.

A further object of the invention is to provide improved crankshaft dampers which remain substantially unaffected by atmospheric changes.

Yet another object of the invention is to provide crankshaft damping means which remain highly efficient throughout a wide temperature range that may be encountered in use, and more especially retain a high degree of operating efficiency at low temperatures although the optimum adjustment is established for a relatively higher normal operating temperature.

A still further object of the invention is to provide crankshaft damping means which are highly adaptable to meet various operational requirements.

An additonal object of the invention is to provide improved tuned inertia mass viscous crankshaft dampers.

Other objects, features and advantages of the present invention will be readily apparent from the following description taken in connection with the accompanying drawings, in which:

Figure 1 is a diametrical sectional view through a tuned inertia mass viscous crankshaft damper embodying features of the present invention, taken substantially along line I—I of Fig. 2;

Figure 2 is a front elevational view of the damper shown in Fig. 1, partially broken away to disclose certain details of construction;

Figure 3 is a diametrical sectional view through a modified form of the damper taken substantially on the line III—III of Fig. 4;

Figure 4 is a front elevational view, partly broken away to disclose details of construction, of the damper of Fig. 3;

Figure 5 is a diametrical sectional view through a further modified form of the invention;

Figure 6 is an end elevational view of the damper of Fig. 5 looking in the direction of the arrows on the line VI—VI of Fig. 5; and Figure 7 is a fragmentary elevational detail view taken substantially on the line VII—VII of Fig. 5.

Although several forms of torsional oscillation or vibration dampers according to the present invention for rotating machinery and particularly for shafts such as crankshafts have been shown and will hereinafter be described in detail, all forms have certain characteristics in common.

An important feature of the dampers resides in the use of a viscous fluid such as a silicone to resist relative motion between a damping inertia mass and a structure secured for rotation with a torsionally oscillating or vibrating mass such as a driven rotary shaft or crankshaft of a machine. More specifically, a flywheel is so disposed in spaced, relatively movable relation to a casing or housing or to internal surfaces carried by the housing, that when the housing or such surfaces rotate with the torsionally oscillating mass such as a crankshaft a thin film of the viscous fluid intervening between the opposing working surfaces of or associated with the flywheel and the adjacent surfaces rotating with the shaft provides a fluid coupling between such surfaces due to the inherent shear resistance of the viscous liquid. That is, the viscous fluid is present between the opposing parallel working surfaces of the flywheel and housing in films which are thicker than a mere lubricating film but which are of less thickness than a layer which will produce only a fluid drag relationship. Stated another way, the shear film of viscous fluid is the result of an essentially linear velocity gradient spacing between the opposing parallel working surfaces of the members with relation to the viscosity of the damping fluid rather than a non-linear velocity gradient relationship. As the shaft tends to oscillate or vibrate in operation the viscous fluid shear films resist the torsional oscillatory or vibrational movements of the shaft superimposed upon the normal rotation of the shaft. The force necessary to shear the viscous film between the flywheel surfaces and the adjacent work surfaces of the housing is proportional to the relative angular velocity between the flywheel and the housing work surfaces. The optimum proportion of the resistance of the viscous film to the moment of inertia of the flywheel is easily calculated for any specific installation.

In the embodiments of the invention disclosed herein, instead of having the damping mass or flywheel relatively independently movably mounted in association with the mass subject to torsional oscillation and rotatable therewith entirely as a result of the shear resistance of the viscous fluid, the flywheel is torsionally connected to the main rotating and torsionally oscillatable mass. The inertia of the flywheel tending to resist torsional vibrations of the main mass is then harnessed to dampen the torsional vibrations through the medium of a film of the viscous fluid acting between the flywheel surfaces and closely adjacent working surfaces within the flywheel housing, and also through the resistance of a damper spring.

The invention contemplates the provision of what may be termed as a tuned damper in which a flexible resilient or torsional mechanical connection is effected between a flywheel structure and a vibrating mass through the medium of a hub by which the damper is connected to a rotary vibrating mass. As a result of such connection, the vibrations or torsional oscillations of the main mass, such as the driven rotary shaft of a machine, are imparted, more or less, to the flywheel which is thus also vibrated or oscillated. But due to the great difference in the respective masses, the flywheel will tend to vibrate or oscillate at a different amplitude which is out of phase with the amplitude of vibration or oscillation of the main vibrating mass. Therefore, there is a tendency towards relative motion of the flywheel and the main mass which, when resisted by the viscous film intervening between the active or working surfaces of the flywheel and opposing working surfaces within the flywheel housing, has the effect of counteracting and dampening the vibration or oscillation in the main mass. A tuned damper is actually much more efficient than a free running damper when used for the same purpose, but must be especially designed for each application to which it is to be put. This does not mean, of course, that each damper must be individually designed, but that for each type of rotary mass to be damped and having a known frequency of amplitude of torsional vibration or oscillation, a damper must be endowed with special frequency response which will cause it to function as desired for that particular practical application. That is, the proportions of the flywheel and its resilient connection must be such that the flywheel has a natural frequency somewhat lower than the natural frequency of the main mass. In this manner, when the frequency of the exciting force in the main mass approaches the natural frequency of the main mass and the damper combination, the damper flywheel vibrates with an amplitude which is large in proportion to the amplitude of vibration of the main mass and energy is then absorbed due to the relative motion between the flywheel and the housing which is overcome by the resisting force of the viscous film.

An adjustable tuned damper as shown in Figs. 1 and 2 is particularly well adapted for heavy duty uses. To this end, the damper comprises a captive relatively massive ring type of flywheel 127 which is secured as by means of screws 128 and dowel pins 129 to the inside margin of an oscillating head plate section 130 on an integral fairly massive axial torsion spring stem 131 extending from an integral flat disk-like hub or base 132.

Assembly of the flywheel over the base is provided for by a slightly smaller diameter of the base 132 than the internal diameter of the flywheel ring. The base 132 forms part of one side of a housing enclosing a viscous fluid chamber 133 within which the flywheel 127 and the spring member 131 and head extension 130 are operative. The remainder of the housing is comprised of a generally cup-shaped shell 134 and conforms generally to the shape of the adjacent surfaces of the flywheel 127 which, in this instance, is of generally rectangular cross section. An outwardly extending axial flange 135 on the housing shell hugs the periphery of the base 132 and is secured rigidly thereto in fluid-tight relation as by welding at 137. The housing shell 134 provided, in cooperation with the base 132, the remainder of one side of the housing and also provides the peripheral wall of the housing, extending substantially beyond the outer face of the spring extension head 130 to provide an internally threaded flange 138. Into this flange is threadedly secured a closure wall plate 139 provided with an integral outwardly radially extending annular peripheral reinforcing flange 140 which is externally threaded for screw cooperation with the housing wall flange 138. A thread seal 141 is provided between the flanges 138 and 140.

The interior of the chamber within the shell 134 and the closure cap 139 is so proportioned with respect to the dimensions of inertia mass assembly including the flywheel ring 127 and the torsionally oscillatable head 130 that only a very narrow shear film spacing persists between the surfaces of the inertia mass and the opposing surfaces of the walls of the casing or housing defining the enclosing chamber 133. The spaces within the chamber 133, inclusive of the shear film spaces are substantially filled with a viscous fluid such as a selected silicone, a commercial example of which may be identified as Dow-Corning Fluid No. 200, having a viscosity rating of approximately 30,000 centistokes at 77° F. It has been found that such fluid has approximately a 100% efficiency at about 160° F. in a damper of the present type. For best results it is recommended that the chamber 133 be filled at a temperature of approximately 200 to 250° F. A good working clearance for the shear film spaces is approximately 1/64 of an inch.

Since the spacing between the opposing surfaces of the spring extension head 130 and the closure wall 139 will determine to a substantial extent the viscous film resistance to relative rotational movement of the flywheel and spring extension head combination with respect to the housing, means are provided for maintaining incrementally variable adjustments in such spacing. Accordingly, the closure wall 139 is provided in the angle defined by the reinforcing and attachment flange 140 with a plurality of interlock blocks 142 which may be welded in place and located at quadrantly spaced points to support interlock tabs 143 within radial grooves 144 and to extend into interlocking relation within selected notches 145 in the outer edge of the housing flange 138. Screws 146 hold the tabs 143 in the interlocking position thereof. As will be seen in Fig. 1, the interlock notches 145 are formed at a plurality of diametrically aligned points in the edge of the flange 138, as for example 30° apart along the entire flange edge, whereby relatively fine incremental adjustments in the spacing between the spring extension head 130 and the closure wall 139 can be effected and indefinitely held.

For attaching the base or hub 132 to the end of a shaft 147 to be dampened, an attachment flange head 148 may be provided on the end of the shaft to receive attachment screws 149 and dowel pins 150 to effect a relatively quick detachable connection.

In the operation of the vibration and oscillation damper of Figs. 1 and 2, oscillations or torsional vibrations in the rotating shaft 147 are transmitted through the hub or base 132 and the integral torsion spring stem 131 and spring extension head 130 to the flywheel 127 which, due to the inertia of its mass, tends to resist such disturbance in its rotary momentum. Meanwhile, the enclosing housing 134—139, including the hub or base 132, tends to follow the vibrations or oscillations of the shaft 147, the inherent resiliency of the spring stem 131 tending to permit the relative rotational deflection or shifting of the housing relative to the flywheel 127 which thus would normally result. However, the viscous film intervening between the flywheel 127 and the opposing surfaces of the housing and the spring extension head 130 resists such relative movement or deflection, and in consequence the oscillations or vibrations are dampened. It will be noted that a relatively large fluid space is provided adjacent to the hub of the damper, fluid from which will be driven by centrifugal force into tenacious damping shear films between the closely spaced working surfaces which are located predominantly adjacent to and at the outer diameter of the device. Filling of this damper is, of course, easily effected by opening the cover 139.

Where operating conditions are such as to cause in the rotating mass, such as a crankshaft, a plurality of modes of torsioned vibration or oscillation, a multi-tuned damper such as that shown in Figs. 3 and 4 may be used. In general this form of the damper is of similar construction and operates like the damper disclosed in Figs. 1 and 2, and identity of reference numerals indicates identity of structural details. The major difference in this multi-tuned damper resides in the provision of a pair of similar split-ring flywheels 151 and 152 which are fixedly carried by spring extension heads 153 and 154, respectively, formed integrally in uniformly spaced parallel relation upon respective torsion spring structures 155 and 156. By preference, the torsion spring structures 155 and 156 are formed as integral coaxial portions of a resilient metal stem which extends integrally and in coaxial relation to a flat disk-like hub base 157 which is welded to the securing flange 135 of the housing and is adapted to be secured by the bolts 149 and dowel pins 150 to an attachment flange 158 on the end of a shaft 159 which is subject to the plurality of modes of vibration which the damper is adapted to counteract.

For the purpose of facilitating assembly and simplification of manufacture, the flywheels 151 and 152 may be formed as split rings comprising two semicircular segments as shown and with each segment rigidly secured to its respective spring extension head by means of a plurality of screws 160 and dowel pins 161.

The flywheels 151 and 152 and their supporting torsion spring structures are so proportioned that in one mode of vibration of the crankshaft 159 the two flywheels will tend to vibrate or oscillate together up to the optimum frequency of such mode of vibration, while in a second mode of vibration of the crankshaft the two flywheels will tend to oscillate in opposite directions at a higher frequency. This higher frequency can be made to correspond to the optimum frequency for damping vibrations of the second mode of vibration of the crankshaft.

In the first mode of vibration of the crankshaft 159, the majority of the damping will be done between the flywheels and the housing, since the flywheels tend to vibrate or oscillate in unison and the viscous fluid film between the opposed working surfaces of the flywheels and the spring extension head 154 and the housing 135 affords the drag upon relative rotation of the flywheels and the housing to effect the damping result. However, in the second mode of vibration of the crankshaft 159, wherein the flywheels 151 and 152 tend to oscillate in opposite directions at a higher frequency, the additional damping effect of the viscous film between the two flywheels, as indicated at 162, comes into play to resist such relative oscillation of the flywheels and thus dampen the second mode of vibration of the associated shaft 159.

Since the closure wall 139 is adjustable axially relative to the spring extension head 154, the best possible results in damping the vibration in the second mode of the crankshaft 159 can be readily attained. The results of such adjustment will, of course, be evident in the operation of the flywheel 152. By adjusting the cover 139 to lie very close to the spring extension head 154, and thus thinning the viscous film between the working surfaces thereof, maximum resistance to independent oscillation of the flywheel 152 relative to the housing 134 is attained without alteration of the viscous film condition surrounding the other flywheel 151. Conversely, adjustment of the cover 139 to effect a greater spacing between it and the adjacent working surface of the spring extension head 154 secures somewhat freer relative movement of the flywheel 152 by reducing the tenacity of the viscous film on the closure side wall of the housing and permit relatively freer oscillatory movement of the latter flywheel.

In the modified form of torsion spring stem viscous vibration damper shown in Figs. 5, 6 and 7, means are provided for effectively multiplying the range of torsional movement of the flywheel or inertia mass and thereby greatly increasing the range of frequency amplitudes for which the damper may be tuned. To this end, a hub member 165 in the form of a relatively thick plate is adapted to be secured to a rotary mass to be damped, such as a crankshaft. Extending radially from the outer margin of the hub plate 165 is a casing wall including a radial portion 167 and a cylindrical axially extending wall portion 168. Cooperating in sealing relation with the edge of the cylindrical wall portion 168 is a closure cap or plate 169 preferably having the edge thereof set into a marginal rabbet groove 170 in the cylindrical wall edge and fixedly secured therein as by means of welding or brazing to provide a hermetic seal. In this manner the hub plate 165 with its wall portions 167 and 168 and the cooperating closure plate 169 provides an enclosing chamber for inertia mass 171 in the form of a fairly massive flywheel.

Means are provided for connecting the flywheel ring 171 in captive relation at its inner periphery to the hub plate member 165. Herein such means comprise a fairly heavy torsion spring steam member 172 having a lateral head 173 disposed within the bore of the flywheel ring 171 and with its periphery engaging the outer marginal portion of the flywheel ring bore. Fixed attachment of the head 173 to the flywheel ring is effected by means of a series of dowels 174 pressed into complementary opposing half sockets 175 and 176 in the engaging portions of the head 173 and the flywheel ring.

The spring stem 172 is preferably of a length to extend substantially outwardly beyond the hub plate 165 and a connection between the hub plate and the spring stem is provided by a tubular torsion spring member 177. For this purpose the outer end of the spring stem 172 is provided with a slightly enlarged portion 178 fitting in close fluid sealing relation within an internally and externally thickened outer terminal portion 179, being fixedly pinned by means of a series of dowels 180. Throughout its maor extent, the tubular torsion spring 177 is of substantially thinner wall than the terminal portion 179 so as to afford substantial torsional resilience of softer or more yieldable nature than the torsional resilience of the torsion spring stem 172.

Connection between the tubular torsion spring 177 and the hub plate 165 is effected through the medium of a thickened and enlarged head end portion 181 on the tubular spring fitting sealingly within a bore 182 in the hub plate 165 and securely pinned against relative rotation by means of a series of dowels 183.

It will thus be observed that the flywheel ring 171 is completely housed within the chamber provided by the enclosing casing members and is maintained captive against free rotation relative to the housing by the torsion spring connection. Hence, when the damper unit is secured to a rotary mass such as a shaft to be damped, the flywheel 171 will be caused to rotate with the housing. However, in the presence of torsional vibrations which are transmitted to the housing by the rotary mass to which it is attached, the flywheel 171 and the housing can have a range of relative oscillatory movement within an amplitude range, or up to a predetermined amplitude determined by the multiple, telescoped, relatively and jointly torsionally operable spring structure 172, 177. By predetermining variations in the spring characteristics of the spring stem 172, or of the tubular spring connector 177, or of both of these elements, a tuned relationship can be attained for a wide range of operating requirements.

Development of a harmonic vibration of the flywheel 171 is prevented by the provision of viscous damping. For this purpose, maximum area of the surfaces of the flywheel ring 171 and opposing parallel working surfaces within the housing is so correlated that close, shear film spacing results. The opposed surfaces of the hub plate 165 and the flywheel ring 171, as well as of the wall portions 167 and 168 and the opposing surface of the flywheel ring, all of the opposing surfaces of the flywheel ring and the cover plate 169, and also of an inward extension 184 of the tubular torsion spring and the opposing internal bore surface of the flywheel ring are in shear film spacing. By preference the end of the spring stem head 173 and the opposing surface of the plate 169 are in shear film spacing. Thus, a viscous damping fluid within the chamber enclosing the flywheel ring 171 has quite effective vibration damping influence upon the inertia mass.

For filling the chamber of the damper with damping fluid, a pair of appropriate apertures in the wall portion 167 are provided which are sealed by appropriate sealing plugs 185.

It will be understood that modifications and variations may be effected without departing from the scope of the novel concepts of the present invention.

I claim as my invention:

1. In combination in a vibration damper of the character described, a housing adapted to be secured to the end of a rotary shaft subject to torsional vibrations or oscillations, a flywheel structure within said housing and subject to the action of a fluid transmission medium, and a stem-like torsion spring device having its axis disposed for alignment with the axis of the shaft and connecting the housing and the flywheel structure.

2. In combination in a fluid conditioned torsional vibration or oscillation damper of the character described, means defining a housing including a hub on one side wall of the housing and adapted for attachment to the end of a rotary shaft subject to torsional vibrations or oscillations, a flywheel structure within said housing, and a torsion spring stem structure on said hub and secured to said flywheel structure to hold the flywheel structure for joint rotation with the housing but permitting a certain range of relative oscillatory motion between the flywheel structure and the housing.

3. In combination in a torsional vibration or oscillation damper of the character described, an end housing including a hub structure on at least one axial side wall of the housing and adapted to be secured to the end of a rotary shaft subject to torsional vibrations or oscillations, a flywheel within said housing and presenting certain surfaces in close proximity to internal surfaces of the housing for the operation of a damping medium between said surfaces, and a torsion spring stem extending in axial relation to said hub within said housing and secured fixedly to said housing, said stem having a head portion secured fixedly to said flywheel.

4. A torsional vibration damper including a housing, an inertia mass within said housing, a torsion stem spring within said housing and having a head secured to said inertia mass, the spring providing a non-rotary captive connection between the housing and the inertia mass, the housing and the inertia mass and the housing and said head having opposing surfaces disposed in closely spaced relation, and shear films of viscous fluid between said closely spaced surfaces.

5. A torsional vibration damper including a housing, an inertia mass within said housing, a torsion stem spring within said housing and having a head secured to said inertia mass, the spring providing a non-rotary captive connection between the housing and the inertia mass, the housing and the inertia mass and the housing and said head having opposing surfaces disposed in closely spaced relation, and shear films of viscous fluid between said closely spaced surfaces, said housing including a hub plate to which the spring is fixedly axially connected.

6. In combination in a torsional vibration damper, means defining a housing, a rotary inertia mass within said housing, and an axially extending torsion spring stem connecting the inertia mass within said housing, said torsion spring stem member being secured at one end to said inertia mass on the axis of rotation of the latter and at the other end to said housing.

7. In combination in a torsional vibration damper, means defining a housing, an inertia mass within said housing, and an axially extending torsion spring structure connecting the inertia mass within said housing, said spring comprising a stem member and a tubular torsion spring member connected together in relatively torsionally movable relation and with the stem member connected to the inertia mass and the tubular member connected to the housing.

8. In combination in a torsional vibration damper, means defining a housing, an inertia mass within said housing, and an axially extending torsion spring structure connecting the inertia mass within said housing, said spring comprising a stem member and a tubular torsion spring member connected together in relatively torsionally movable relation and with the stem member connected to the inertia mass, said housing and said tubular spring member having respective surfaces thereof in closely spaced relation to opposing surfaces of the inertia mass and having shear films of viscous damping fluid therebetween.

9. In combination in a torsional vibration damper of the character described, a housing, an inertia mass within said housing, and a multiple torsion spring connecting the housing and the inertia mass and comprising a stem member and a tubular member relatively and jointly torsionally operable to permit relative torsional movement within limits of the housing and the inertia mass.

10. In combination in a torsional vibration damper of the character described, a housing, an inertia mass within said housing, and a multiple torsion spring connecting the housing and the inertia mass and comprising a stem member and a tubular member relatively and jointly torsionally operable to permit relative torsional movement within limits of the housing and the inertia mass, said stem member and said inertia mass being respectively connected together by means of respective series of dowels secured between interfaces of the members.

11. In combination in a torsional vibration or oscillation damper of the character described, a housing structure including hub structure for attachment to a rotary shaft subject to two modes of torsional vibrations or oscillations, a plurality of flywheels within said housing structure, and torsion spring means securing said flywheels to said hub structure for joint and independent rotary movement with respect to each other and to said housing, whereby to provide a tuned damper for damping the two modes of vibration of the shaft.

12. In combination in a torsional vibration or oscillation damper of the character described, a housing structure adapted to be secured to a rotary shaft subject to torsional vibrations or oscillations to be damped, a plurality of flywheel masses within said housing, and torsion spring structure securing said flywheel masses to said housing structure for joint and relative rotary movement.

13. In combination in a torsional vibration or oscillation damper, a support adapted to be fixedly associated with a rotary shaft subject to a plurality of modes of torsional vibrations or oscillations to be damped, a plurality of vibration-damping flywheel masses, and means connecting said flywheel masses to said support operative to effect joint rotation of the flywheel masses with said support but leaving the flywheel masses relatively independent of one another whereby said flywheel masses are adapted to be tuned to the respective modes of vibration of said rotary shaft.

14. In combination in a vibration damper, a casing member having an open side, a closure member threadedly engaging with the casing member and closing said open side, an inertia mass within the housing defined by the casing member and the closure member, viscous fluid in the housing and operative between opposing surfaces of the inertia mass and said closure member to restrain relative vibratory movements, one of said members having a plurality of spaced radially extending notches therein adjacent to the other of said members, and the other of said members having a plurality of disengageable tabs projecting radially therefrom into locking engagement with certain of said notches to maintain the members in relative positions of rotary adjustment for determining the spaced relation of the closure member to the opposing surface of the inertia mass.

15. In a self-contained tuned inertia mass vibration damper, a supporting member arranged to be secured on the axis of rotation of a member subject to torsional vibration about said axis, an elongated torsion spring element fixedly attached to said supporting member in such relation as to be concentric with said axis in operation, an oscillatory inertia mass carried by the distal end portion of said torsion spring element, said member carrying means defining a fluid-tight housing enclosing said torsion spring element and said inertia mass, said inertia mass and said housing having opposing surfaces disposed in shear film spaced relationship, and a viscous damping fluid within said housing and providing a vibration damping shear film of the fluid in the shear film spacing between said surfaces.

16. In combination in a torsional vibration damper, means defining a housing, an inertia mass within said housing, and an axially extending torsional spring structure connecting the inertia mass within said housing, said spring comprising a stem member and a tubular torsion spring member connected together in relatively torsionally movable relation and with the stem member connected to the inertia mass, said tubular spring member also being torsionally movable relative to the inertia mass and the tubular spring member and the inertia mass having opposing surfaces in shear film spaced relation and with a shear film of viscous damping fluid therebetween.

References Cited in the file of this patent

UNITED STATES PATENTS

| 2,012,939 | Bibby | Sept. 3, 1935 |

FOREIGN PATENTS

| 62,233 | Denmark | Apr. 24, 1944 |
| 406,637 | Great Britain | Sept. 2, 1933 |
| 434,355 | Great Britain | Aug. 29, 1935 |
| 508,513 | Great Britain | July 3, 1939 |